(12) United States Patent
Murata

(10) Patent No.: US 8,500,288 B2
(45) Date of Patent: Aug. 6, 2013

(54) REAR-PROJECTION TYPE DISPLAY DEVICE FOR PERFORMING DISTORTION DETECTION AND DISTORTION CORRECTION

(75) Inventor: Taisuke Murata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 131 days.

(21) Appl. No.: 12/848,614

(22) Filed: Aug. 2, 2010

(65) Prior Publication Data

US 2011/0043770 A1    Feb. 24, 2011

(30) Foreign Application Priority Data

Aug. 18, 2009    (JP) ................................. 2009-189088

(51) Int. Cl.
*G03B 21/00*    (2006.01)
(52) U.S. Cl.
USPC ................ 353/70; 353/69; 353/121; 353/122
(58) Field of Classification Search
USPC ..................................... 353/69, 70, 121, 122
See application file for complete search history.

(56) References Cited

U.S. PATENT DOCUMENTS

| | | | |
|---|---|---|---|
| 5,309,222 A | 5/1994 | Kamei et al. | |
| 6,412,956 B2* | 7/2002 | Fujita et al. | 353/122 |
| 7,262,816 B2* | 8/2007 | McDowall et al. | 348/745 |
| 7,396,133 B2* | 7/2008 | Burnett et al. | 353/69 |
| 7,876,384 B2* | 1/2011 | McDowall et al. | 348/745 |
| 8,228,445 B2* | 7/2012 | McDowall et al. | 348/745 |
| 2001/0015793 A1 | 8/2001 | Fujita et al. | |
| 2002/0164083 A1 | 11/2002 | Song et al. | |
| 2005/0110912 A1 | 5/2005 | Song et al. | |
| 2006/0098168 A1* | 5/2006 | McDowall et al. | 353/70 |
| 2006/0119800 A1* | 6/2006 | Burnett et al. | 353/69 |
| 2008/0259288 A1 | 10/2008 | Murata | |

FOREIGN PATENT DOCUMENTS

| | | |
|---|---|---|
| JP | 2001-166377 A | 6/2001 |
| JP | 2005-328570 A | 11/2005 |
| JP | 2008-268579 A | 11/2008 |
| WO | WO 2010/013289 A1 | 2/2010 |

* cited by examiner

*Primary Examiner* — Francis M Legasse, Jr.
*Assistant Examiner* — Bao-Luan Le
(74) *Attorney, Agent, or Firm* — Birch, Stewart, Kolasch & Birch, LLP

(57) ABSTRACT

A rear-projection type display device has a projection device, a transmission type screen, a housing, and input means. The projection device projects a light from a light source, as an optical image. The optical image is projected to the transmission type screen. The housing accommodates the projection device and the transmission type screen. A user operation is inputted to the input means. The rear-projection type display device includes a storage section, a distortion amount detection section, a correction amount calculation section, and a correction section. The storage section stores a distortion detection image to be displayed on the transmission type screen. The distortion amount detection section changes the distortion detection image in accordance with an operation inputted from the input means, and detects a distortion amount of the image based on operations inputted by the input means until the distortion detection image displayed on the transmission type screen is brought into a predetermined state. The correction amount calculation section calculates a correction amount based on the distortion amount. The correction section corrects an image projected by the projection device, based on the calculated correction amount.

6 Claims, 7 Drawing Sheets

F I G. 4
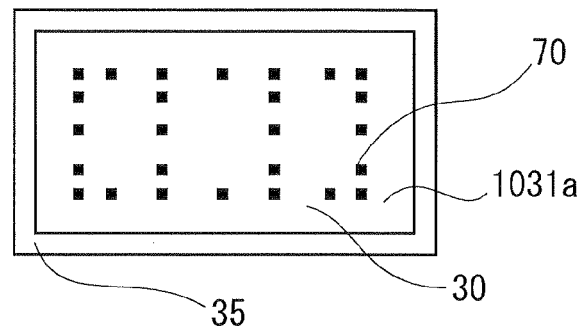

F I G. 5
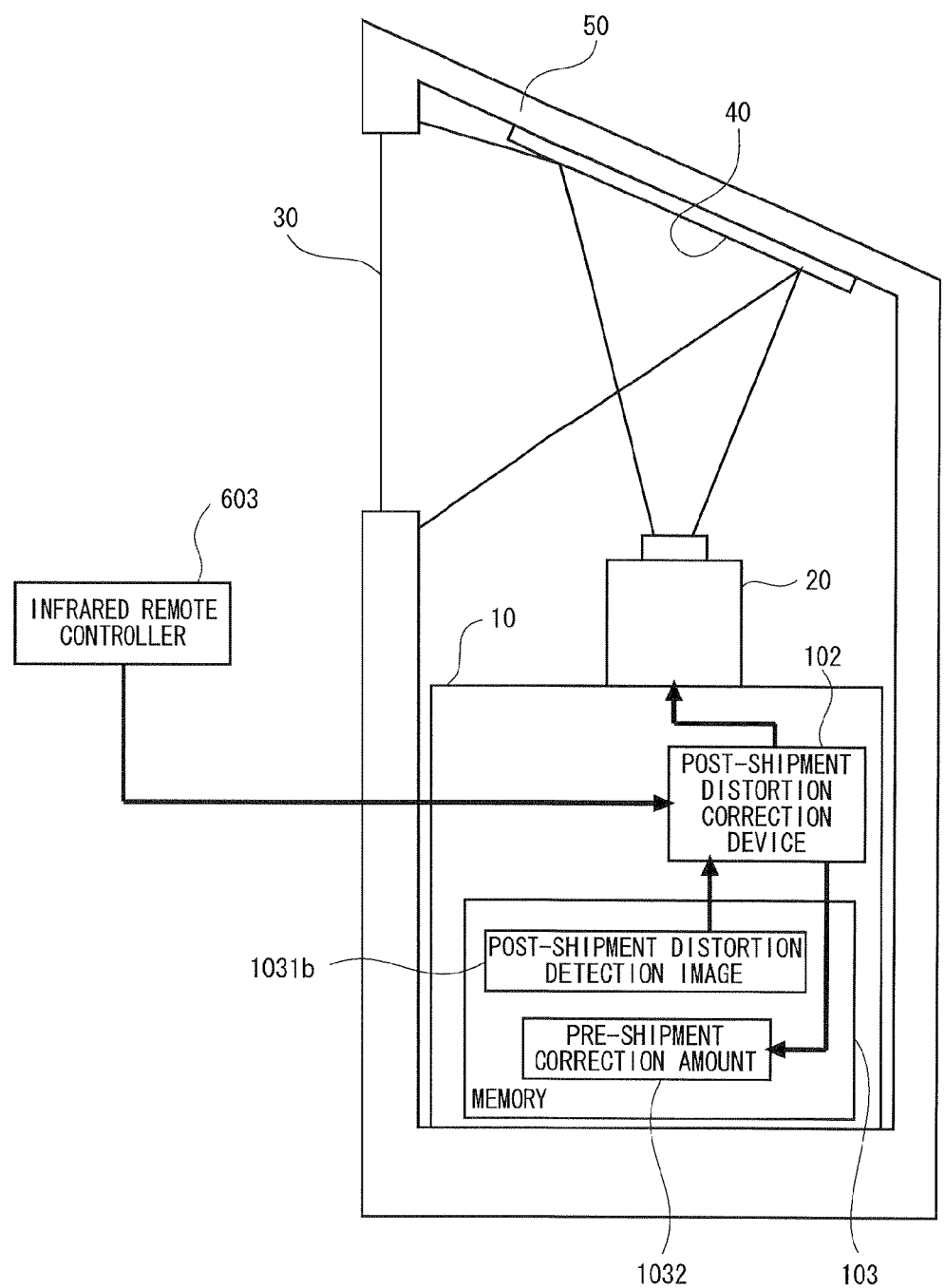

REAR-PROJECTION TYPE DISPLAY DEVICE FOR PERFORMING DISTORTION DETECTION AND DISTORTION CORRECTION

BACKGROUND OF THE INVENTION

1. Field of the Invention

The present invention relates to a projection type display device, and particularly to a rear-projection type display device capable of correcting a distortion of an image projected to a screen.

2. Description of the Background Art

A projection type display device modulates a light outputted from a light source by means of a display device, forms an optical image corresponding to an image signal, and enlarges and projects the optical image to a screen by means of a projection lens, to thereby display a large-screen image. A rear-projection type display device is a projection type display device which projects an image from a rear side of a transmission type screen.

However, the projection type display device involves a problem that if a positional relationship between a screen and a projection device is misaligned, a projected image is distorted into a trapezoidal shape. Additionally, in the projection type display device, an optical component part such as a mirror is provided on an optical path extending from the projection device to the screen. Thus, the projection type display device also involves a problem that a distortion may occur in a display image due to optical characteristics of the optical component part. A projected image having the distortion caused by the optical characteristics of the optical component part has not only a trapezoidal shape but also a complicated shape in which a contour of the image is not a straight line.

To correct the distortion, it is necessary to accurately recognize a distortion amount. The distortion is measured in accordance with a distance of a position at which the projected image is displayed from a position in the screen at which the projected image should be displayed. For this purpose, there is a method of projecting to a screen an image including a detection point used for a correction and detecting a position of the detection point projected to the screen by using a detection device such as a camera. In order to increase an accuracy of the correction, it is necessary to display a plurality of detection points in each of an outer peripheral portion and an interior portion of the image.

If the distortion amount is recognized, then the distortion is corrected by deforming an image-to-be-displayed such that the image can be correctly displayed if a distortion is added thereto.

Although the projection type display device is shipped from a factory with a distortion correction having been performed, a distortion newly occurs in an image due to, for example, a change in the positional relationship between the screen and the projection device which is caused by vibrations during transportation to a place where the projection type display device is actually used. Accordingly, a projection type display device capable of correcting a distortion even in a place of use is required. There is a method of installing an optical sensor as a detection device for detecting an image distortion in a projection type display device, detecting an image distortion by using an output from the optical sensor obtained when an image for a correction is projected, and correcting a detected distortion (see Japanese Patent Application Laid-Open No. 2008-268579). However, this method requires installation of a plurality of optical sensors for the correction of the distortion, which makes a structure complicated.

SUMMARY OF THE INVENTION

An object of the present invention is to provide a rear-projection type display device capable of easily performing a distortion correction in a place where the rear-projection type display device is used, such as in a typical home.

The present invention is directed to a rear-projection type display device including a projection device that projects a light from a light source as an optical image, a transmission type screen to which the optical image is projected, a housing that accommodates the projection device and the transmission type screen, and input means to which a user operation is inputted. The rear-projection type display device further includes a storage section, a distortion amount detection section, a correction amount calculation section, and a correction section. The storage section stores a distortion detection image to be displayed on the transmission type screen. The distortion amount detection section changes the distortion detection image in accordance with an operation inputted from the input means, and detects a distortion amount of the image based on operations inputted by the input means until the distortion detection image displayed on the transmission type screen is brought into a predetermined state. The correction amount calculation section calculates a correction amount based on the distortion amount. The correction section corrects an image projected by the projection device, based on the calculated correction amount.

The rear-projection type display device according to the present invention can easily perform a distortion correction in a place where the rear-projection type display device is used, such as in a typical home.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an example of a pre-shipment distortion detection image used in the rear-projection type display device according to the preferred embodiment 1 of the present invention;

FIG. 5 is a diagram illustrating how a post-shipment distortion correction is performed in the rear-projection type display device according to the preferred embodiment 1 of the present invention;

DESCRIPTION OF THE PREFERRED EMBODIMENTS

Preferred Embodiment 1

Figure 1:
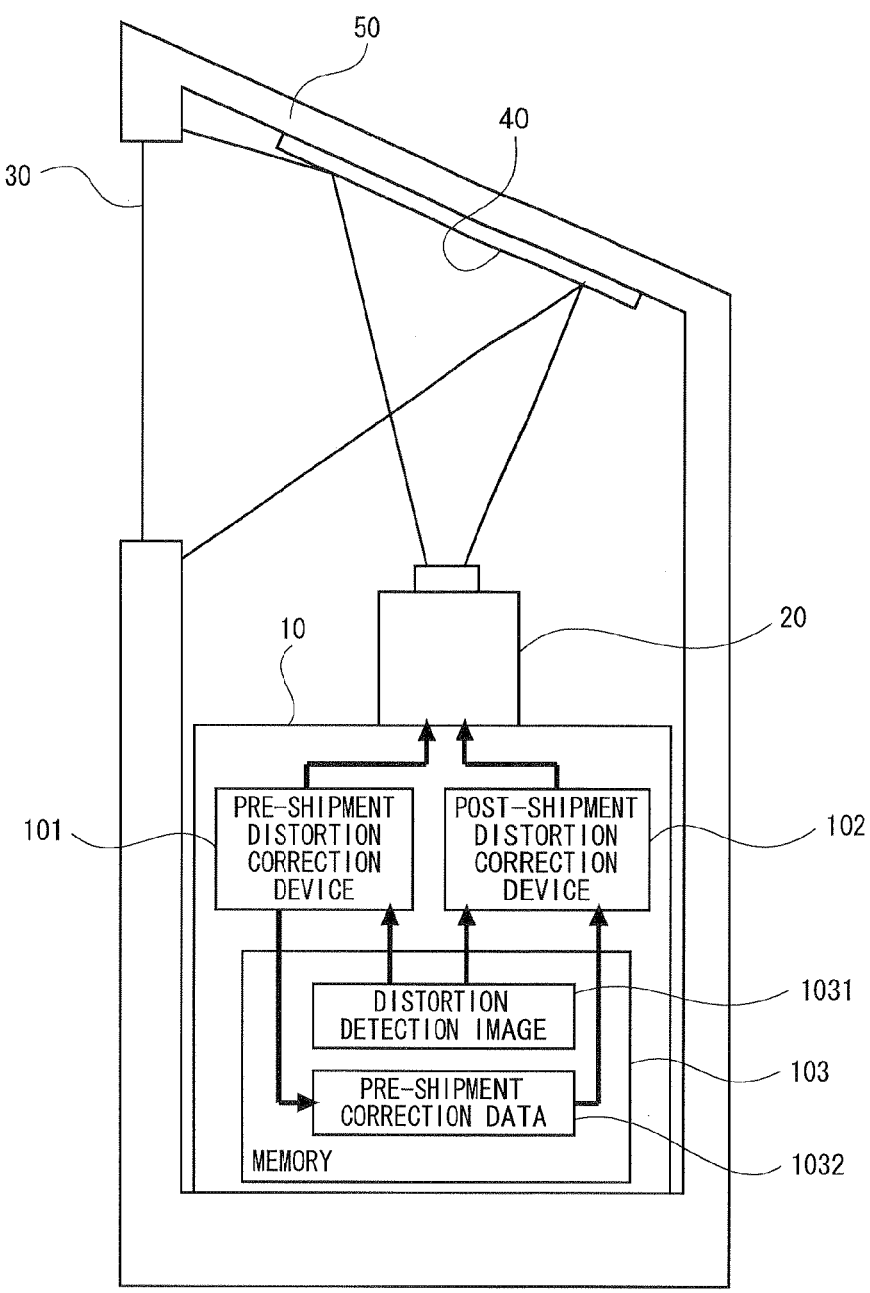
FIG. 1 is a diagram schematically showing a rear-projection type display device according to a preferred embodiment 1 of the present invention.

FIG. 1 shows main component parts of a rear-projection type display device according to a preferred embodiment 1 of the present invention. In FIG. 1, the rear-projection type display device includes a projection device 20, an outer housing 50, a transmission type screen 30, and a distortion correction device 10. The projection device 20 projects a light from a light source, as an optical image. The outer housing 50 accommodates the projection device 20. The transmission type screen 30 is provided to the outer housing 50, and the optical image given from the projection device 20 is projected to the transmission type screen 30. The distortion correction device 10 corrects a distortion included in a projected image projected by the projection device 20. The optical image having the distortion corrected by the distortion correction device 10 is projected by the projection device 20. A mirror 40 reflects the projected optical image toward the transmission type screen 30, to form the optical image on the transmission type screen 30.

The distortion correction device 10 in FIG. 1 has two correction devices, namely, a pre-shipment distortion correction device 101 and a post-shipment distortion correction device 102, and further has a memory 103. The pre-shipment distortion correction device 101 corrects a distortion of a screen before shipment. At a time of the correction, the pre-shipment distortion correction device 101 reads out a distortion detection image 1031 from the memory 103 to use the distortion detection image 1031, and stores pre-shipment correction data 1032 in the memory 103. The post-shipment distortion correction device 102 corrects a distortion after the shipment from a factory. At a time of the correction, the post-shipment distortion correction device 102 reads out the distortion detection image 1031 and the pre-shipment correction data 1032 from the memory 103, and uses the distortion detection image 1031 and the pre-shipment correction data 1032.

Figure 2:
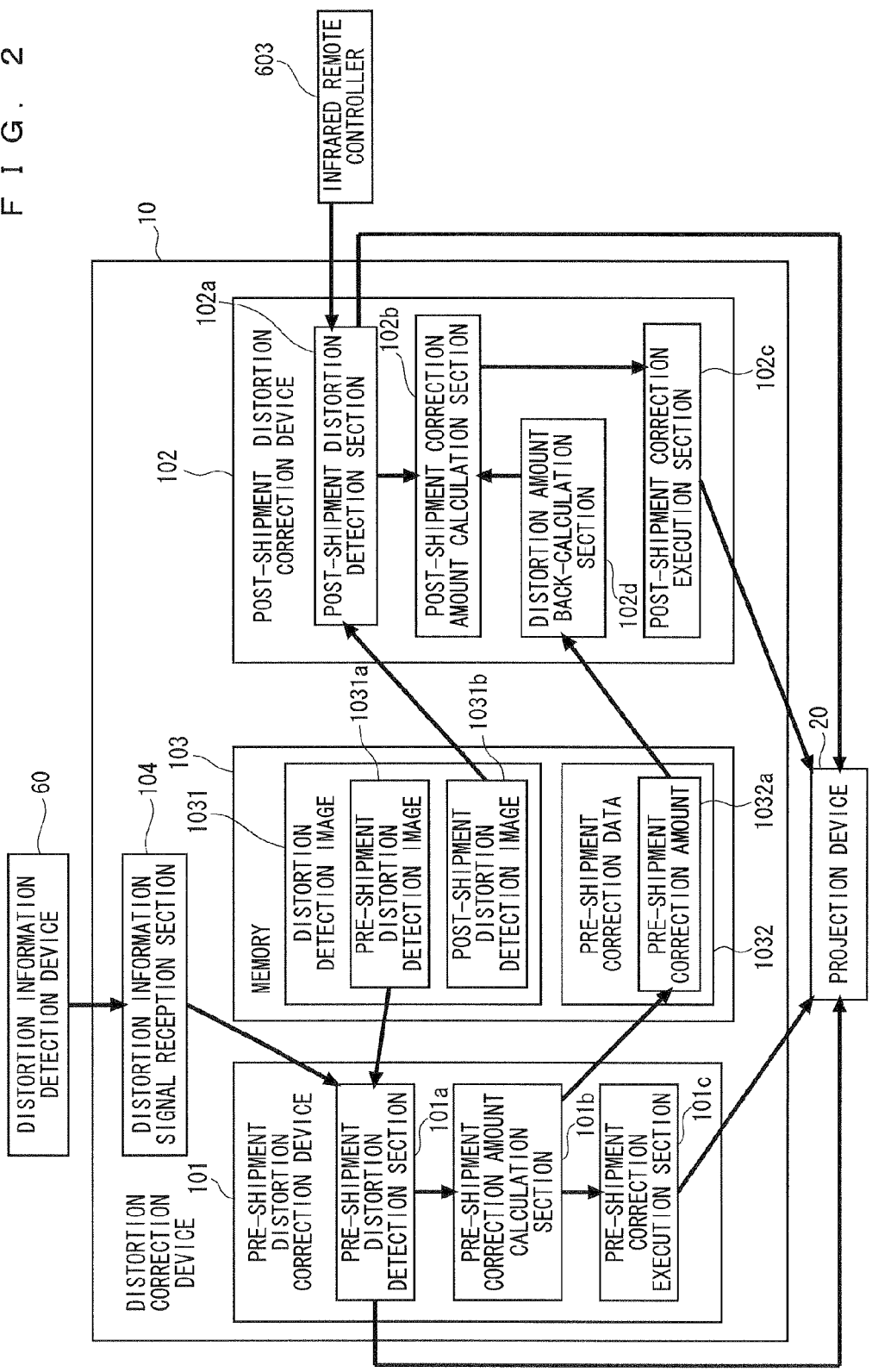
FIG. 2 is a diagram showing a configuration of a distortion correction device included in the rear-projection type display device according to the preferred embodiment 1 of the present invention.

FIG. 2 is a diagram showing a configuration of the distortion correction device 10. The pre-shipment distortion correction device 101 has a pre-shipment distortion detection section 101a which detects the distortion amount, a pre-shipment correction amount calculation section 101b which calculates the correction amount based on the distortion amount, and a pre-shipment correction execution section 101c which performs a correction based on the correction amount. The post-shipment distortion correction device 102 has a post-shipment distortion detection section 102a which is a distortion amount detection section, a post-shipment correction amount calculation section 102b which is a correction amount calculation section, a post-shipment correction execution section 102c which is a correction section, and a distortion amount back-calculation section 102d which calculates the distortion amount based on the correction amount. The memory 103 which is a storage section stores a pre-shipment distortion detection image 1031a and a post-shipment distortion detection image 1031b, as the distortion detection images 1031. The memory 103 also stores a pre-shipment correction amount 1032a, as the pre-shipment correction data 1032. The pre-shipment correction amount 1032a is a past correction amount which is a correction amount for correcting a distortion amount detected at a certain time point. A distortion information detection device 60 which is used for correcting a pre-shipment distortion amount has a camera 601 which captures an image displayed on the transmission type screen 20, and an image analyzer 602 which processes the image captured by the camera 601 and detects distortion information of the image. A distortion information reception section 104 receives the distortion information detected by the distortion information detection device 60.

In a pre-shipment distortion correction process, firstly, the pre-shipment distortion detection section 101a detects a distortion. The detection of the distortion is performed by reading out the pre-shipment distortion detection image 1031a from the memory 103, projecting the pre-shipment distortion detection image 1031a to the transmission type screen 30 by the projection device 20, and detecting distortion information of the projected image by the distortion information detection device 60. The distortion information thus detected is transmitted to the distortion information reception section 104 by the distortion information detection device 60. The distortion information received by the distortion information reception section 104 is transmitted to the pre-shipment distortion detection section 101a, so that the distortion amount is detected. The distortion amount thus detected is transmitted from the pre-shipment distortion detection section 101a to the pre-shipment correction amount calculation section 101b. In the pre-shipment correction amount calculation section 101b, an optimal correction amount for correcting the detected distortion amount is calculated by using a predetermined relational expression. The correction amount thus calculated is transmitted to the pre-shipment correction execution section 101c. The pre-shipment correction execution section 101c sets a parameter of the projection device 20 in such a manner that an image signal of an image to be projected by the projection device 20 can be corrected based on the pre-shipment correction amount 1032a. The correction amount calculated by the pre-shipment correction amount calculation section 101b is stored as the pre-shipment correction amount 1032a in the memory 103.

Figure 3:
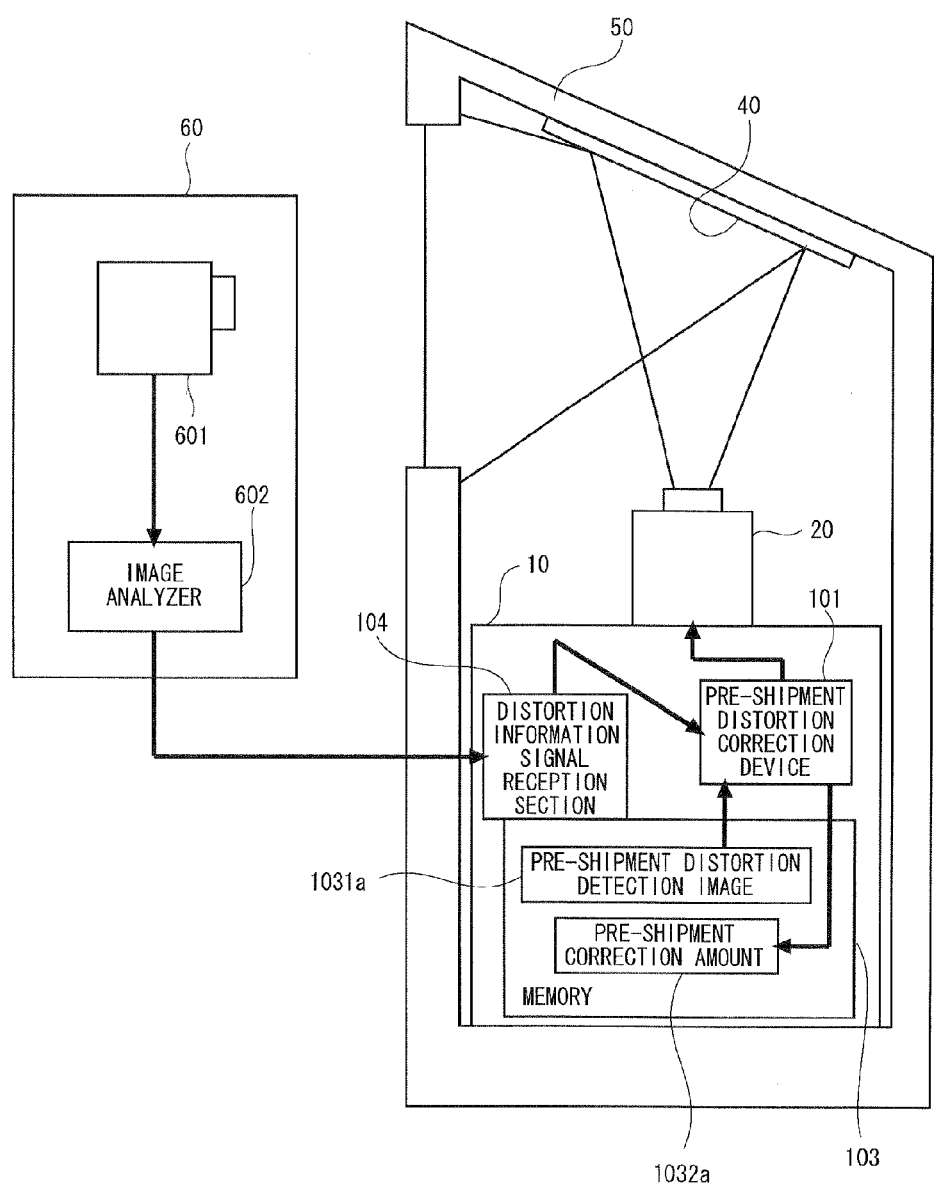
FIG. 3 is a diagram illustrating how a pre-shipment distortion correction is performed in the rear-projection type display device according to the preferred embodiment 1 of the present invention.

FIG. 3 is a diagram illustrating how a pre-shipment distortion correction is performed. A frame 35 shown in FIG. 4 is a structural member provided at a periphery of the screen 30. The camera 601 can capture an image of an entire front surface of the screen 30 and the frame 35 provided at the periphery of the screen 30. The captured image is analyzed by the image analyzer 602, to calculate the distortion info nation which is then transmitted to the distortion information reception section 104.

FIG. 4 shows an example of the pre-shipment distortion detection image 1031a, and a state where an image is projected to and displayed on the screen 30 is shown. Detection points 70 are indicated by black squares, and a background excluding the detection points 70 is white-colored. The pre-shipment distortion detection image 1031a includes twenty-six detection points 70. In each of upper and lower portions of the image, seven detection points 70 are horizontally arranged. In a region between the upper and lower portions, there are three horizontal rows each including four detection points 70. There are four vertical columns each including five detection points 70.

The camera 601 captures an image of the pre-shipment distortion detection image 1031a including the detection points 70 which is displayed on the screen 30, and the frame 35. The captured image is analyzed by the image analyzer 602, and position information of all the detection points 70 is calculated. A difference between the position of each detection point 70 from the position at which the detection point 70 should be placed is calculated. Here, the position at which the detection point 70 should be placed means an ideal position at which the detection point 70 will be displayed if there is no distortion. Since the position at which the detection point 70 should be placed can be calculated in advance, the position at which the detection point 70 should be placed is calculated in advance and recorded in the image analyzer 602. An example of the position information of the detection point 70 is a ratio of distances from ends of the four sides of the frame 35, namely, the upper, lower, left, and right sides of the frame 35. The distortion information is received by the distortion information reception section 104. By using the detected distortion information, the pre-shipment distortion correction device 101 calculates the correction amount, and a correction is performed.

Here, a description will be given of a primary distortion component and secondary and subsequent distortion components of the distortion amount. A displacement of an image display position can be adjusted by a user, and therefore is not included in the distortion amount referred to in the present invention. The primary distortion component is a distortion component which causes a horizontal or vertical straight line to be displayed as a non-horizontal or non-vertical straight line. If there is the primary distortion component, a rectangular image is displayed so as to have a deformed quadrangular shape with an interior angle of not 90 degrees. The primary distortion component of the distortion amount is caused mainly by a misalignment in the positional relationship between the screen and the projection device.

The secondary and subsequent distortion components are distortion components other than the primary distortion component, which cause a straight line to be displayed as a non-straight line. The secondary and subsequent distortion components are caused by optical characteristics of an optical component part such as a mirror located on an optical path extending from the projection device to the screen.

In a post-shipment distortion correction process, the post-shipment distortion detection section 102a detects a distortion. The post-shipment distortion detection section 102a reads out the post-shipment distortion detection image 1031b from the memory 103, and projects the post-shipment distortion detection image 1031b to the transmission type screen 30 by the projection device 20, to display the post-shipment distortion detection image 1031b. At this time, the projection device 20 displays the image without an image correction based on the pre-shipment correction amount 1032a. This is because, if a corrected image is displayed, the distortion information includes the correction, which makes the process complicated. A corrected image may be displayed if a process for removing the correction from the distortion information is performed and the distortion amount is calculated.

In the post-shipment distortion correction process, an image displayed on the transmission type screen 30 can be changed by operating an infrared remote controller 603 which is input means to which a user operation is inputted. Operations inputted from the infrared remote controller 603 until the image displayed on the transmission type screen 30 is brought into a predetermined state are detected as the distortion information by the post-shipment distortion detection section 102a. The distortion amount detected by the post-shipment distortion detection section 102a is transmitted to the post-shipment correction amount calculation section 102b.

The post-shipment correction amount calculation section 102b reads out the pre-shipment correction amount 1032a from the memory 103, calculates a pre-shipment distortion amount based on the pre-shipment correction amount 1032a by the distortion amount back-calculation section 102d, and calculates the correction amount by using the calculated pre-shipment distortion amount and the distortion amount detected by the post-shipment distortion detection section 102a. The correction amount thus calculated is transmitted to the post-shipment correction execution section 102c, and the post-shipment correction execution section 102c sets a parameter of the projection device 20 in such a manner that an image signal of an image to be projected by the projection device 20 can be corrected based on the correction amount calculated by the post-shipment correction amount calculation section 102b.

Figure 6:
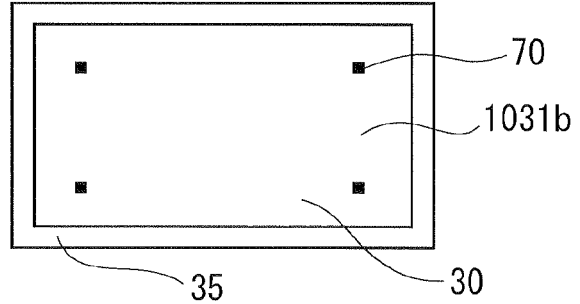
FIG. 6 shows an example of a post-shipment distortion detection image used in the rear-projection type display device according to the preferred embodiment 1 of the present invention.

FIG. 5 is a diagram illustrating how a post-shipment distortion correction is performed. FIG. 6 shows an example of the post-shipment distortion detection image 1031b, and a state where an image is projected to and displayed on the screen 30 is shown. There are four detection points 70. The number of the detection points 70 is reduced as compared with the twenty-six detection points 70 included in the pre-shipment distortion detection image 1031a. As for a color of the image, the detection points 70 are black-colored, and a background excluding the detection points 70 is white-colored. The post-shipment distortion detection section 102a can operate the position of the detection point 70 of the post-shipment distortion detection image 1031b, based on a signal inputted from the infrared remote controller 603. The detection point 70 is moved by changing the post-shipment distortion detection image 1031b.

The distortion information is obtained as the amount of movement of each detection point 70 when the detection point 70 is moved to a corner of the frame end by using the infrared remote controller 603. In a post-shipment correction, operations executable by the infrared remote controller 603 include selecting a detection point 70 to be moved, moving a detection point 70 to four directions of upward, downward, leftward, and rightward, returning a detection point 70 to a position thereof before the movement, determining the completion of movements of all the detection points 70, and the like. During the movement of the detection point 70, if the operation of moving the detection point 70 in one of the upward, downward, leftward, and rightward directions is performed on the infrared remote controller 603, a corresponding movement signal is transmitted to the post-shipment distortion detection section 102a. The post-shipment distortion detection section 102a operates the post-shipment distortion detection image 1031b such that the detection point 70 can be moved in the direction corresponding to the movement signal. The operation of movement includes several kinds of operations such as a large movement operation and a small movement operation. A movement amount is determined for each operation. A movement amount obtained by operations performed until a detection point 70 is moved to a corner at the end of the frame 35 serves as distortion information of the detection point 70. The movement may be performed only by one kind of operation.

Based on the distortion information of the four detection points 70, the post-shipment distortion detection section 102a calculates how an image which should be displayed as a rectangle is displayed as a deformed quadrangle, that is, calculates a distortion amount corresponding to the primary distortion component. As an example of a method of calculating a distortion amount caused after shipment, a calculation of a distortion amount in an upper portion of the screen will be described. In the post-shipment distortion detection image 1031b, there are two detection points 70 in the upper portion of the screen. To what degree a primary expression obtained by connecting these two points is shifted from the horizon corresponds to the distortion amount.

The post-shipment correction amount calculation section 102b calculates a correction amount based on the distortion amount detected by the post-shipment distortion detection section 102a and the pre-shipment distortion amount calculated based on the pre-shipment correction amount 1032a by the distortion amount back-calculation section 102d. As for the primary distortion component of the distortion amount, a difference between the post-shipment and the pre-shipment is obtained, to calculate a distortion amount caused after shipment. The post-shipment correction amount calculated based on the distortion amount caused after the shipment is a value for correcting only the distortion amount caused after the shipment. The correction amount is transmitted to the post-shipment correction execution section 102c, and a correction is performed. At this time, a correction by the pre-shipment correction execution section 101c is simultaneously performed, too.

It may be also acceptable that the secondary and subsequent distortion components of the pre-shipment distortion amount are combined with the primary distortion component of the post-shipment distortion amount to obtain a resultant as a distortion amount at that time point after the shipment, a correction amount is calculated based on this distortion amount, and the post-shipment correction execution section 102c performs a correction. In this case, the pre-shipment correction execution section 101c does not perform a correction.

Thereby, the primary distortion component caused after the shipment can be corrected at a place where the rear-projection type display device is installed without use of any special device, while the pre-shipment correction performed on the secondary and subsequent distortion components is maintained.

There is a possibility that the positional relationship between the screen and the projection device is misaligned due to, for example, vibrations during transportation to a place of installation after the shipment from the factory. Thus, the primary distortion component is often changed after the shipment. It can be considered that the optical characteristics of the optical component part are hardly changed. Accordingly, the rear-projection type display device of this preferred embodiment 1 is installed in a place of use while both of the distortions corresponding to the primary distortion component and the secondary and subsequent distortion components are appropriately corrected.

If the number of detection points displayed in the post-shipment distortion detection image is increased, a time period required for detecting a distortion amount is increased, but the secondary and subsequent distortion components can also be corrected after the shipment. Not the pre-shipment correction amount but the pre-shipment distortion amount may be stored.

Preferred Embodiment 2

Figure 7:
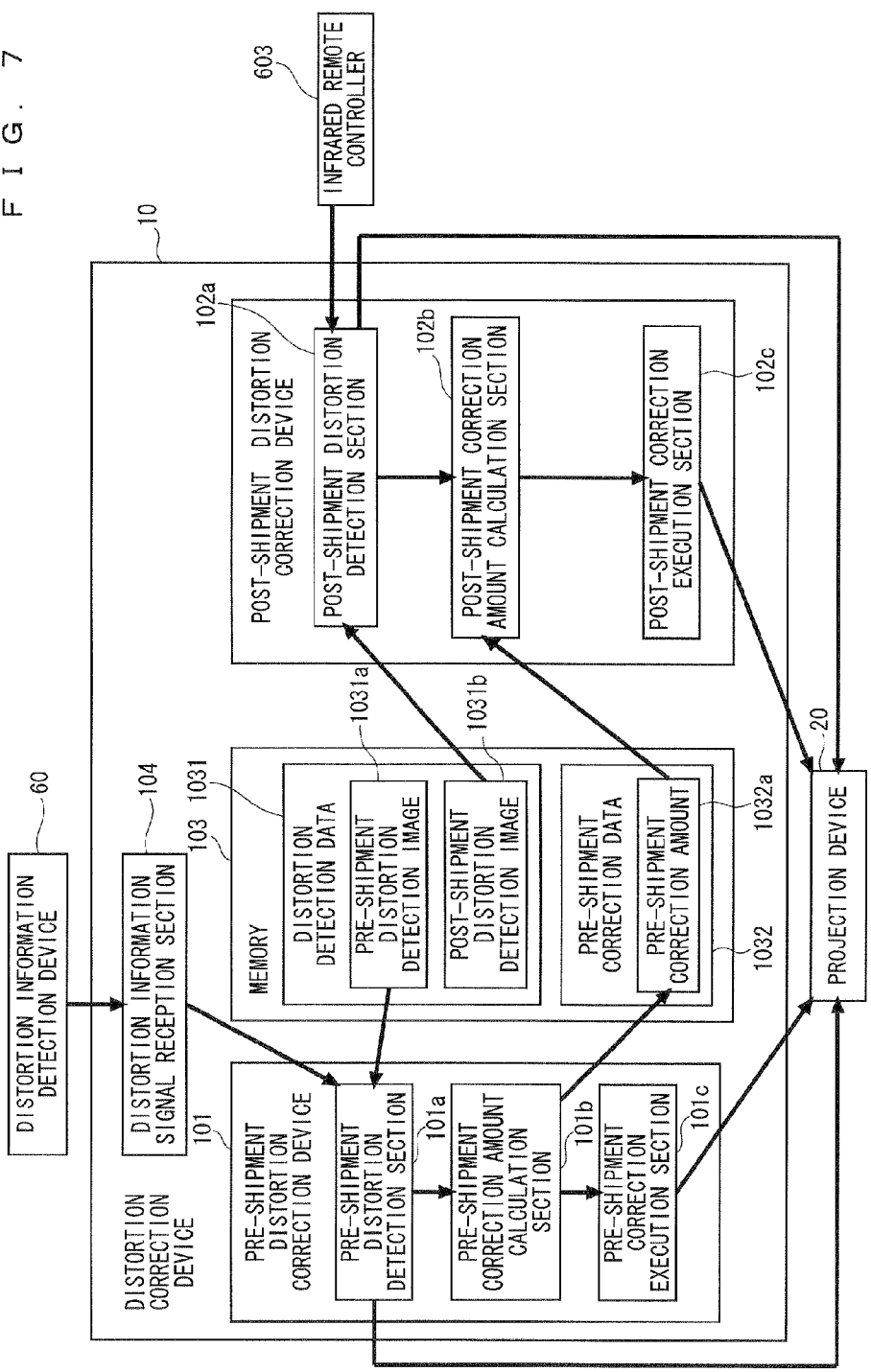
FIG. 7 is a diagram showing a configuration of a distortion correction device included in a rear-projection type display device according to a preferred embodiment 2 of the present invention.

FIG. 7 is a diagram showing a configuration of a distortion correction device included in a rear-projection type display device according to a preferred embodiment 2 of the present invention. In the preferred embodiment 2, a pre-shipment distortion amount 1032b is used as the pre-shipment correction data 1032. The pre-shipment distortion detection section 101a of the pre-shipment distortion correction device 101 stores the pre-shipment distortion amount 1032b in the memory 103. The post-shipment distortion correction device 102 does not have the distortion amount back-calculation section 102d. The pre-shipment distortion amount 1032b is a past distortion amount which is a distortion amount detected at a certain time point.

The post-shipment distortion detection section 102a operates in the same manner as in the preferred embodiment 1, and obtains the distortion information. The post-shipment correction amount calculation section 102b combines the primary distortion component detected by the post-shipment distortion detection section 102a and the secondary and subsequent distortion components of the pre-shipment distortion amount 1032b read out from the memory 103 to calculate a distortion amount at that time, and calculates a correction amount based on this distortion amount. The correction amount is transmitted to the post-shipment correction execution section 102c, and a correction is performed.

Thereby, the primary distortion component caused after the shipment can be corrected at a place where the rear-projection type display device is installed without use of any special device, while the pre-shipment correction performed on the secondary and subsequent distortion components is maintained.

While the invention has been shown and described in detail, the foregoing description is in all aspects illustrative and not restrictive. It is therefore understood that numerous modifications and variations can be devised without departing from the scope of the invention.

What is claimed is:

1. A rear-projection type display device including a projection device that projects a light from a light source as an optical image, a transmission type screen to which said optical image is projected, a housing that accommodates said projection device and said transmission type screen, and input means to which a user operation is inputted, said rear-projection type display device comprising:

a storage section that stores a distortion detection image to be displayed on said transmission type screen and a past correction amount which is a correction amount for correcting a past distortion amount which is a distortion amount detected at a certain time point;

a distortion amount detection section that changes said distortion detection image in accordance with an operation inputted from said input means, and detects a distortion amount of the image based on operations inputted by said input means until said distortion detection image displayed on said transmission type screen is brought into a predetermined state;

a correction amount calculation section that calculates a correction amount based on the distortion amount and calculates said correction amount by analyzing both the distortion amount detected by said distortion amount detection section and said past distortion amount;

a correction section that corrects an image projected by said projection device, based on the calculated correction amount;

a distortion amount back-calculation section that calculates a corresponding distortion amount based on the correction amount, wherein said distortion amount back-calculation section calculates said past distortion amount based on said past correction amount, said correction amount calculation section calculates said correction amount by analyzing both the distortion amount detected by said distortion amount detection section and said past distortion amount.

2. The rear-projection type display device according to claim 1, wherein the distortion amount is divided into a primary distortion component which causes a rectangle to be displayed as a deformed quadrangle, and secondary and subsequent distortion components which are distortion components other than said primary distortion component, said distortion amount detection section detects said primary distortion component.

3. The rear-projection type display device according to claim 1, wherein a correction amount for correcting a distortion amount detected before shipment is recorded as said past correction amount in said storage section.

4. The rear-projection type display device according to claim 1, wherein said distortion amount detection section detects a distortion amount by using said distortion detection image which is projected without any correction performed thereon by said correction section.

5. The rear-projection type display device according to claim 2, wherein said distortion amount detection section detects a distortion amount by using said distortion detection image which is projected without any correction performed thereon by said correction section.

6. The rear-projection type display device according to claim 3, wherein said distortion amount detection section detects a distortion amount by using said distortion detection image which is projected without any correction performed thereon by said correction section.

* * * * *